United States Patent [19]

Roth

[11] Patent Number: 5,040,753

[45] Date of Patent: Aug. 20, 1991

[54] PIPE SUPPORT

[76] Inventor: Steven Roth, 2891 Danville Blvd., Alamo, Calif. 94507

[21] Appl. No.: 527,861

[22] Filed: May 24, 1990

[51] Int. Cl.⁵ .................................................. F16L 3/08
[52] U.S. Cl. .................................. 248/74.2; 24/20 R; 24/20 S; 403/381
[58] Field of Search ................... 248/74.2, 74.1, 74.4, 248/74.5, 73, 65, 313; 24/20 R, 20 S, 330, 333; 403/381

[56] References Cited

U.S. PATENT DOCUMENTS

| 1,775,712 | 9/1930 | Alvord | 248/74.4 |
| 4,131,258 | 12/1978 | Okuda et al. | 248/74.2 X |
| 4,300,271 | 11/1981 | Wohlhaupter | 403/381 X |
| 4,306,697 | 12/1981 | Mathews | 248/74.2 X |
| 4,555,083 | 11/1985 | Carter | 403/381 X |
| 4,653,716 | 3/1987 | Sakaguchi | 248/74.5 X |

FOREIGN PATENT DOCUMENTS

| 1272412 | 7/1968 | Fed. Rep. of Germany | 248/74.2 |
| 3015534 | 11/1981 | Fed. Rep. of Germany | 248/74.2 |
| 1477777 | 3/1967 | France | 248/74.1 |
| 2483563 | 12/1981 | France | 248/74.2 |
| 0927731 | 6/1963 | United Kingdom | 248/74.2 |
| 1601824 | 11/1981 | United Kingdom | 248/74.2 |

Primary Examiner—Ramon O. Ramirez
Attorney, Agent, or Firm—Glen R. Grunewald

[57] ABSTRACT

A pipe support for supporting an insulated pipe including a pipe supporting surface having springy lateral extensions which extend upwardly from the pipe supporting surfaces to embrace the pipe around more than half of its circumference, a hanger engaging surface connected to and separated from the pipe support surface by structural elements so that the distance between the pipe support surface and the hanger engaging surface is at least the wall thickness of insulation.

10 Claims, 3 Drawing Sheets

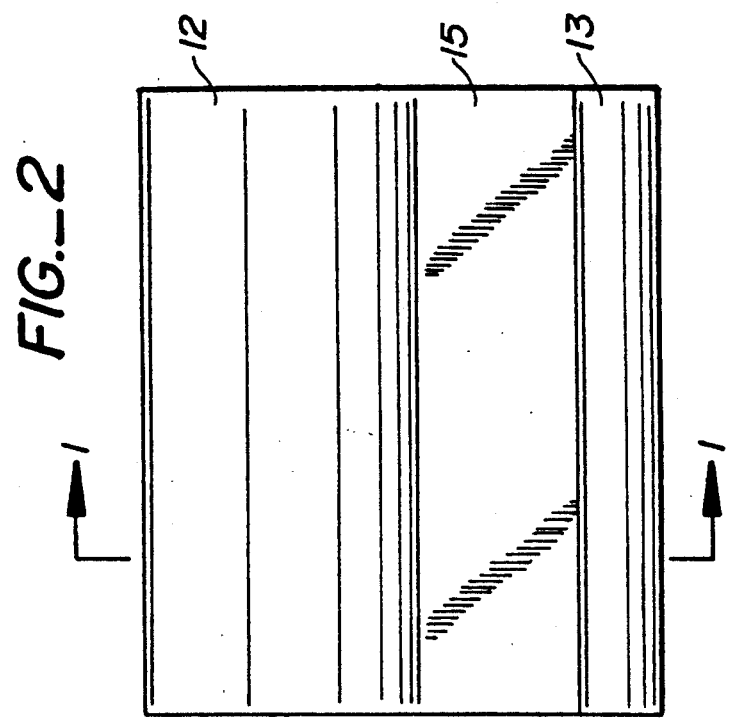
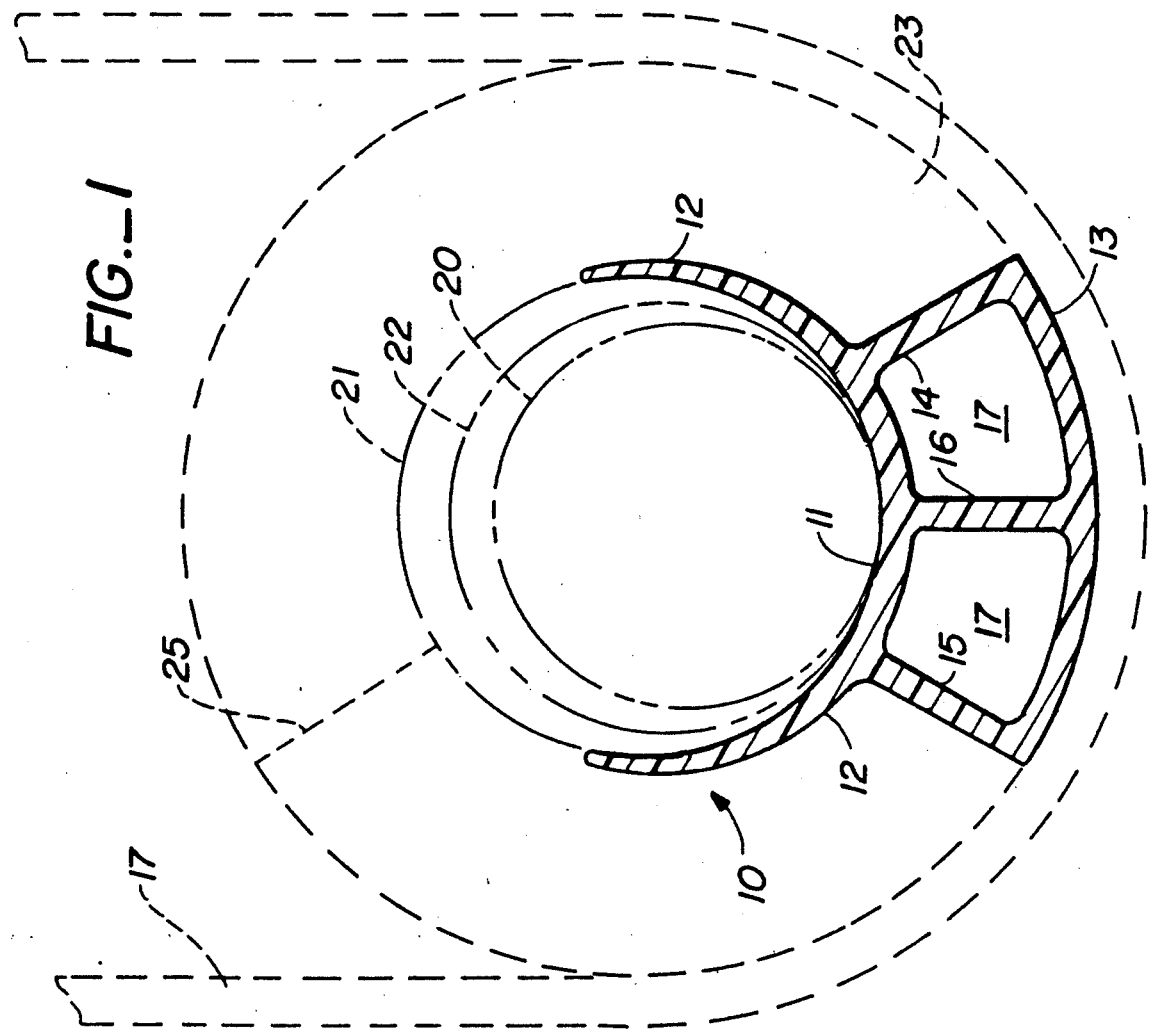

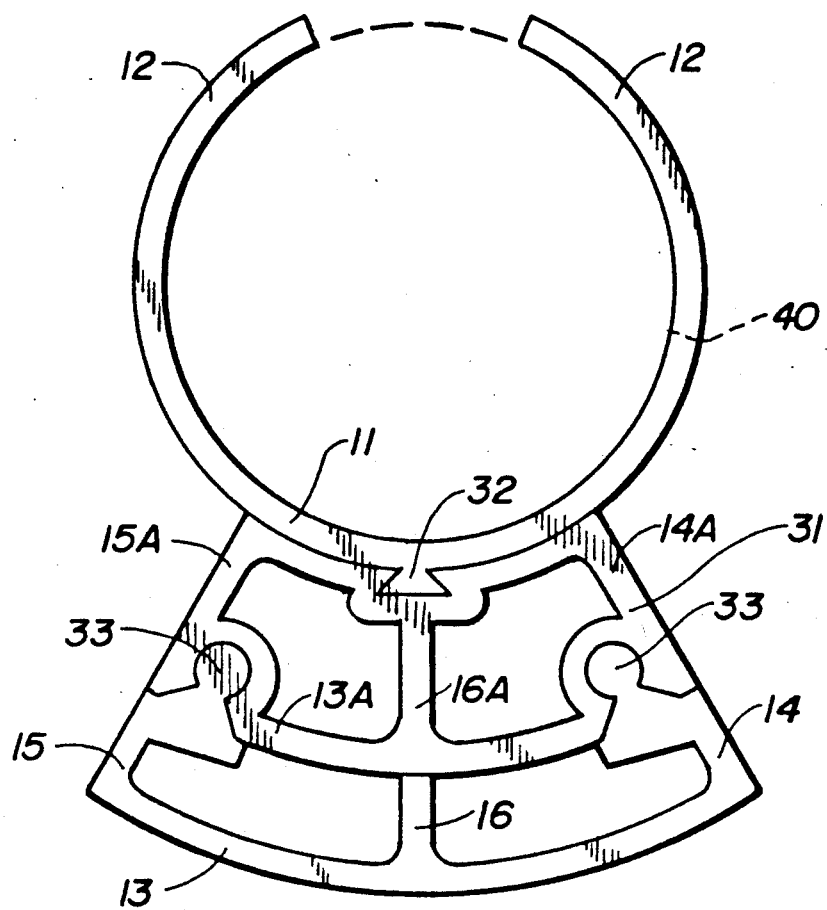
FIG._3
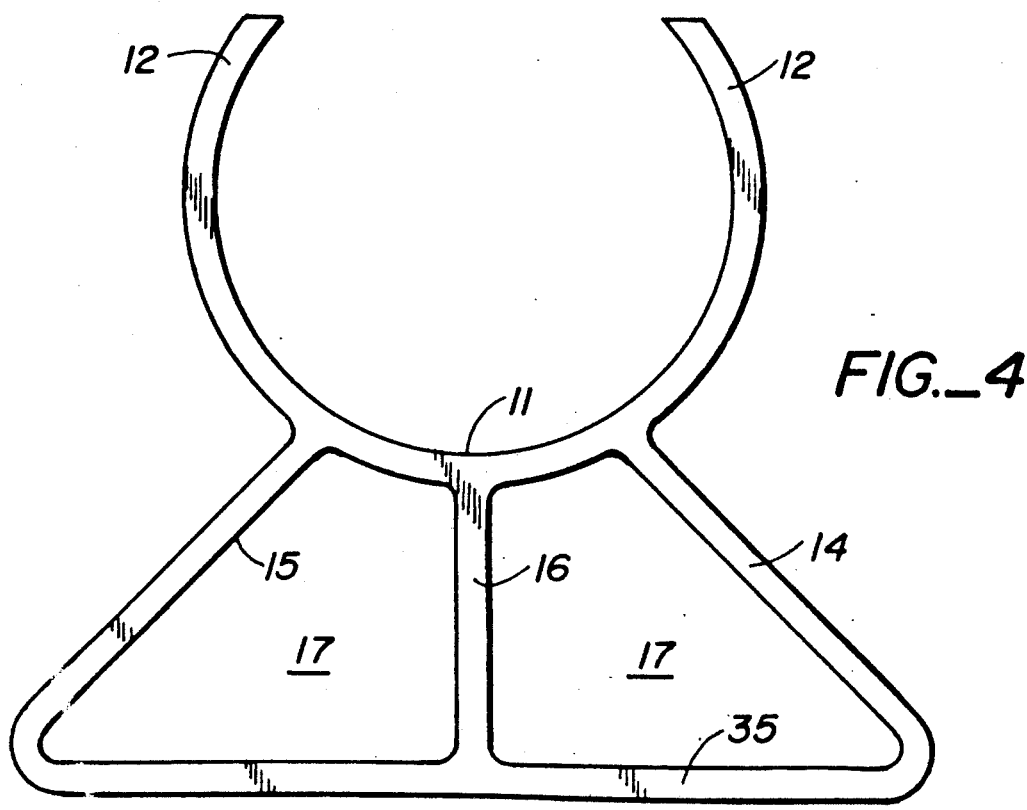
FIG._4

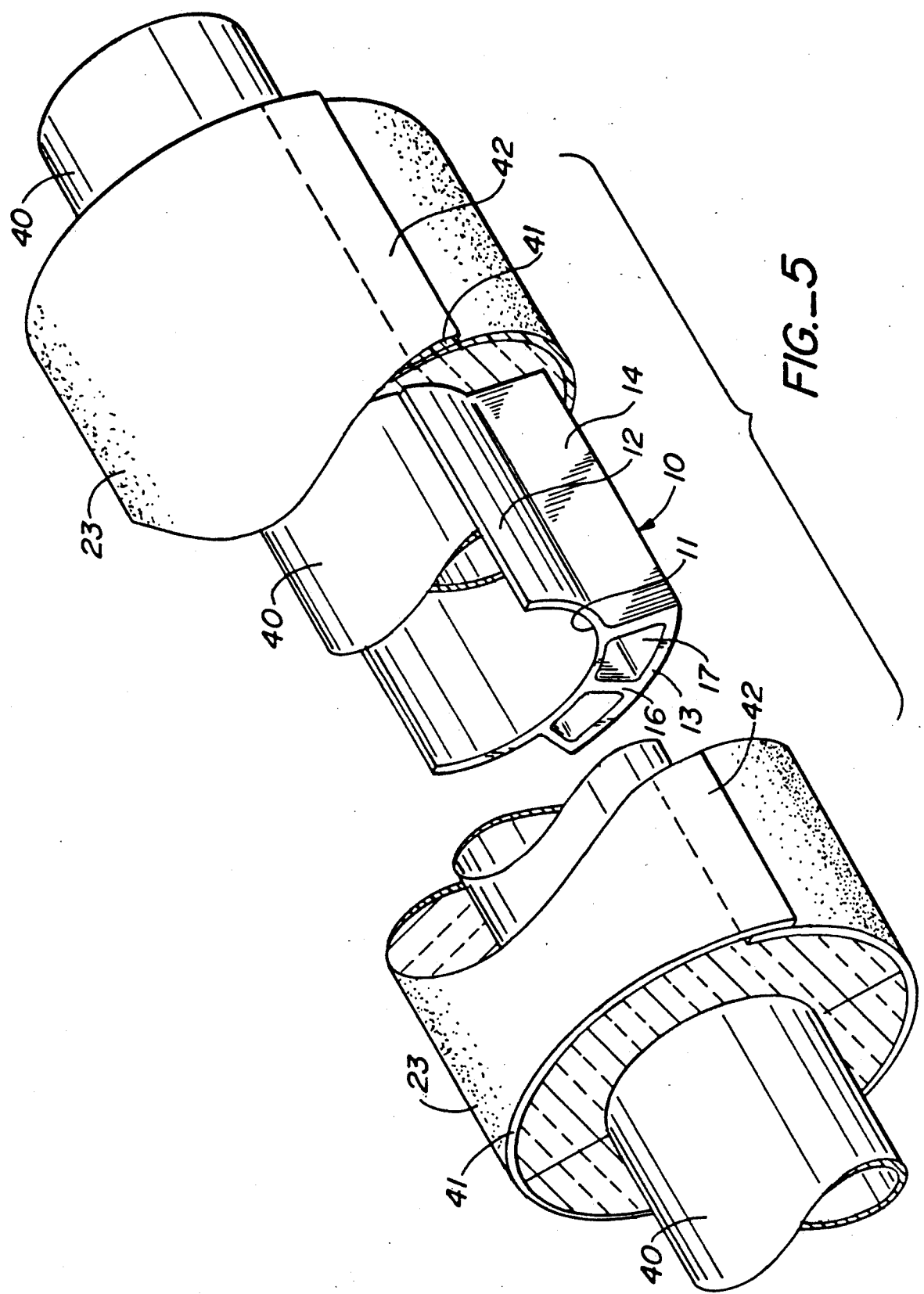

PIPE SUPPORT

TECHNICAL FIELD

This invention is in the field of devices to support insulated pipes for carrying fluids.

BACKGROUND ART

Insulated pipe is used to transport fluid that is hotter or colder than the ambient environment. The insulation commonly used for residential, commercial and light industrial pipe is made from fiberglass. Such insulation is cylindrical and wrapped with paper or fabric and frequently with aluminum foil in such a manner that individual lengths upon like clam shells around a hinge of paper or fabric. The insulation normally comes in three-foot lengths and it normally has a bent-back paper or fabric tab adjacent the opening between the two semi-cylindrical pieces that is provided with pressure-sensitive adhesive so that when the two cylindrical halves are placed around a pipe and brought together the tab can be adhesively connected to the other cylindrical half. The abutting ends of three-foot cylindrical pieces, after they are placed around the pipe, are connected together with a circumferencially wrapped piece of adhesive tape to provide virtually continuous insulation and a virtually continuous vapor barrier provided by the aluminum foil that is present both in the wrapping around the insulation and in the tape sealing abutting edges together.

In some applications insulation is made of stiff, chalky mineral material. Such insulation also comes in the shape of predetermined lengths of half-cylinders and it is also installed around pipes b placing two half-cylinders together around the pipe and holding them in place with wires after which they are wrapped in canvas, paper, foil or other material to hold them firmly in place, to seal all cracks and in most cases to provide a vapor barrier.

Long horizontal runs of pipes are supported with hangers that ar usually in the form of metal strips suspended from beams. The metal strips may be bent to conform with the circumference of the insulation around the pipe being supported or they may be straight horizontal stripe upon which one or more insulated pipe is placed. Hangers are normally spaced between 10 and 15 feet apart so long runs of pipe will be supported by man hangers.

Fiberglass pipe insulation is easily crushed or compressed at a position where it is supported by a pipe hanger. When insulation is crushed or compressed it looses some of its insulating value and it may be subject to deterioration because of vibration or thermal expansion and contraction. The brittle mineral insulation is also eroded where it is supported on hangers because of the weight of the pipe and thermal expansion and contraction. To avoid damage to insulation where it is supported on a hanger, pipe supports are frequently used. Some pipe supports ar semi-cylindrical pieces of metal that are usually approximately nine inches long. They are placed beneath the insulated pipe where it contacts the hanger. Another frequently used pipe support is a piece of insulation having an inside diameter approximately the outside diameter of the insulated pipe being supported. Pipe supports of this nature spread the weight of the supported, insulated pipe over a greater area to diminish crushing or deterioration of the insulation. They are difficult to install and at best they diminish the destruction of the insulation or its insulating value but not completely eliminate it.

DISCLOSURE OF THE INVENTION

This invention is a pipe support that solves the above-noted problems by supporting an insulated, fluid-carrying pipe directly by the pipe rather than by the surrounding insulation, but in a manner that does not create a significant break in the insulation continuity. The device of this invention includes a pipe support element on which the pipe is directly supported. The upper part of the pipe support element is arcuate with the arc having a curvature approximately the curvature of the circumference of the supported pipe, or a little larger. The device of this invention also includes a pipe hanger engaging element that is adapted to be supported directly on pipe hanger. The pipe hanger engaging element is spaced from the pipe support element by structural elements which are poor heat conductors. The spacing between the pipe supporting surface of the pipe support element and the hanger engaging surface of the hanger engaging element is approximately the wall thickness of the insulation surrounding the pipe. Because pipe insulation is made with standard wall thicknesses, devices of this invention can be made in sizes that correspond to those wall thicknesses so that a contractor installing insulated pipes can easily maintain an inventory of devices embodying this invention in only a few standard sizes. The pipe supporting surfaces of devices of this invention can be made in sizes that correspond to the standard pipe sizes. One size of arcuate pipe supporting surface of a device embodying this invention can be used with at least three different pipe sizes in that close conformity of the arcuate surface of this device with the circumference of the pipe is not essential.

The device of this invention is preferably made of plastic or other material that has poor thermal conductivity. When insulation is abutted against both sides of the support of this invention the effect is continuous insulation even though the support penetrates the insulation to hold the pipe directly. In preferred embodiments of the invention the pipe supporting element of the device includes lateral restraints which are springy so that a pipe can be held centered on the device before insulation is applied to it. The springy lateral restraints also permit the support to be "clipped" onto the pipe before it is installed on a hanger and then slid along the pipe length to a position where it is in contact with the hanger. This aspect of the device of this invention makes its installation very easy, in effect giving the installer another hand because he does not have to hold the pipe support on the pipe and above the hanger while insulation is being installed around the pipe. The hanger of this invention can be slid axially over the pipe if the lateral restraints are not springy enough to clip it on the pipe.

BRIEF DESCRIPTION OF THE DRAWINGS

FIG. 1 is a front elevation view of a support embodying this invention showing in phantom three sizes of pipe that it can support, insulation surrounding the pipe and a typical hanger.

FIG. 2 is a side elevation view of the support shown in FIG. 1.

FIG. 3 is a front elevation view of another support embodying this invention.

FIG. 4 is a front elevation view of another support embodying this invention.

FIG. 5 is a partially broken-away perspective view of a support embodying this invention supporting an insulated pipe.

BEST MODE FOR CARRYING OUT THE INVENTION

The pipe support of this invention is generally indicated as 10. The pipe support includes a pipe supporting arcuate surface 11 upon which the outer circumference of a pipe rests when it is being supported. The surface includes lateral restraints 12 which may be integral with the surface or may be separately connected. The lateral restraints 12 are springy and are long enough so that they extend around more than half the circumference of a pipe having the same circumference as arcuate surface 11. In other words, when any pipe of a suitable size to be supported by support 10 is resting on arcuate surface 11, lateral restraints 12 will extend more than halfway around the outer circumference of that pipe and will be held in a clip-on fashion to hold the support onto the pipe by the spring-like action of the lateral restraints 12.

The pipe support of this invention also includes a hanger engaging element 13 which is shown in FIG. 1 as being arcuate and approximately the circumference of a hanger such as hanger 18 illustrated in phantom. The illustrated embodiment of the invention also includes structural elements 14, 15 and 16 which provide column-like supports between hanger engaging element 13 and pipe supporting surface 11 and, in the illustrated embodiment, define air spaces 17. The support illustrated in FIG. 1 is preferably made of material that has very poor heat conductivity, such as plastic, and the air spaces 17 provide good insulation so that heat loss through the device is by way of conduction through structural elements 14, 15 and 16 and through air spaces 17.

Also shown in phantom in FIG. 1 are three pipe sizes that could be supported by the single illustrated support. The smallest pipe circumference is shown at 20, the largest pipe circumference is shown at 21, and a mid-size pipe circumference is shown at 22. Normally, a single support may be used with three consecutive pipe sizes. The position of lateral restraints 12 in FIG. 1 indicate that the support is illustrated as it would be to support the largest pipe circumference 21. In this position restraints 12 are exerting force radially against the wall of the pipe.

Insulation 23 normally comes as two semi-cylindrical halves around which paper or fabric coating 41 (see FIG. 5) is wrapped and connected to it adhesively. The coating may also include a foil layer as a vapor and radiation barrier. This coating acts as a hinge so that the two halves can be opened, clam-shell-like, to place them around a pipe. Separating planes abut as illustrated at 25. The insulation has diametrically opposed abutting surfaces on the other side and, as illustrated in FIG. 1, the abutting surface of one half abuts against structural element 14 and the abutting surface on the other half is cut away to form a new abutting surface that abuts against structural element 15. Cutting insulation is easily accomplished with a knife and when the installation of the insulation is completed the pipe is completely surrounded with insulation except the portion resting in contact with arcuate surface 11, and that portion is insulated by support 10 itself which includes isolated air space 17 and poorly conducting structural elements 14, 15 and 16.

FIG. 3 illustrates an embodiment of this invention that is particularly useful to support pipes in environments wherein the temperature of the pipe being supported is too hot for ordinary plastic material. The support illustrated in FIG. 3 is a three-part support although it may be made as a two-part support. The arcuate pipe supporting surface 11 may be made of metal such as aluminum which can withstand significantly higher temperature than plastic without losing its structural strength. In the embodiment illustrated in FIG. 3 the lateral restraints 12 are integral with pipe supporting surface 11. The embodiment illustrated in FIG. 3 also shows that the distal ends of lateral restraints 12 are much closer together than the diameter of any pipe to be supported and that they may be sprung apart in order to seat the pipe against supporting surface 11.

The support of FIG. 3 has an intermediate part 31 which comprises structural elements 14A, 15A and 16A which correspond with structural elements 14, 15 and 16, illustrated in FIG. 1. The intermediate part 31 connects to the pipe supporting element through a dovetail 32 and, in the illustrated embodiment, it is connected through connectors 33 to a lower hanger engaging surface 13 which holds intermediate part 31 above the hanger on which the whole device will rest. Structural elements 14, 15 and 16 correspond with and are directly aligned with elements 14A, 15A and 16A to provide a strong and direct support between pipe 40 and a hanger on which element 13 will rest.

Preferably, the pipe support surface 11 and restraints 12 are made of aluminum or heat-resistant plastic material while intermediate part 31 is made of plastic that can withstand high temperatures and the lower part including the hanger engaging element 13 is made of ordinary plastic that is selected because of its strength and low cost.

The three-piece support illustrated in FIG. 3 is composed entirely of extrudable cross sections so that their complexity is not a detriment to their use. The pipe supports of this invention are normally three to six inches long so the three elements illustrated in FIG. 3 can readily be assembled by sliding them together without the necessity of using a tool other than perhaps a hammer. The support of FIG. 3 may be used without the lower segment when insulation with thinner walls is used. When regular insulation 23 is used, all segments are employed but when thin-walled insulation 23A is used, the lowermost support element need not be used.

FIG. 4 illustrates an embodiment of this invention whereby the support is adapted to support a pipe on a flat hanger rather than an arcuate hanger. Flat hangers are frequently made quite wide to accommodate a number of supports as shown in FIG. 4 placed side-by-side to support a number of pipes. The flat hanger supporting surface 35 is placed directly on a flat hanger and insulation is applied to the pipe s that it abuts the support elements 14 and 15 in the manner described above.

FIG. 5 best illustrates the relationship of the various elements of this invention to pipe and to insulation after they are installed. A pipe hanger (not shown) will occupy a position directly beneath support 10. The pipe 40 is installed to rest on the pipe supporting surface 11 of support 10 and lateral restraints 12 grasp pipe 40 and hold it firmly in position. Insulation 23 is placed around both pipe 40 and restraints 12 as shown and an adhesive tab 42 extending from covering 41 seals one insulation half to the other so that the insulation becomes an integral cylindrical element surrounding the pipe. The insulation is cut out so that a shape corresponding to the profile of support 10 is removed after which one abutting surface of insulation 23 is placed in contact with structural element 14 and the other in contact with structural element 15. Abutting insulation pieces are normally held in place with a piece of tape aroun the circumference of both insulation pieces and such a tape connection employed with the device of this invention will completely surround the insulation, being in contact with hanger engaging element 13 around its outer periphery. FIG. 5 illustrates the wrapping 41 around the insulation pieces and how the adhesively attached overlap function to produce a connection between the two insulation halves.

I claim:

1. A pipe support for pipe surrounded by insulation comprising:
   a pipe support element having an upwardly facing, arcuate pipe support surface;
   lateral restraints extending laterally and upwardly from said pipe support surface toward distal ends;
   a hanger engaging element having an arcurate lower hanger engaging surface and an upwardly extending structural element holding said pipe support element above and spaced from said hanger engaging element, said arcurate hanger engaging element having a circumference coinciding with the circumference of said insulation and said structural element holding said pipe support element spaced from said hanger engaging element a distance substantially equal to the thickness of said insulation.

2. The pipe support of claim 1 wherein said pipe support element and lateral restraints are integral.

3. The pipe support of claim 1 wherein said lateral restraints are springy.

4. The pipe support of claim 1 wherein the distal ends of said lateral restraints are closer to each other than the outside diameter of the pipe size to be supported and extend around more than half of the circumference of the pipe size to be supported.

5. The pipe support of claim 1 wherein said pipe support element and said hanger engaging element are integral.

6. The pipe support of claim 1 wherein said pipe support element and said hanger engaging element comprise a plurality of interconnected pieces.

7. The pipe support of claim 1 wherein said hanger engaging element comprises a plurality of interconnecting pieces.

8. The support of claim 7 wherein the height of each interconnecting piece is the same as an increment of diameter of pip insulation.

9. A pipe support for insulated pipe comprising
   a pipe support element having an upwardly-facing pipe support surface,
   lateral restraints extending laterally and upwardly from said pipe support surface,
   a hanger-engaging element comprising a plurality of inter-connected pieces, the uppermost of said inter-connected pieces having an upwardly extending structural element holding said pipe support element, the lowermost of said inter-connected pieces having a hanger-engaging surface and a second upwardly extending structural element, and
   inter-connecting means to connect one of said inter-connected pieces to another of said inter-connected pieces.

10. The pipe support of claim 9 wherein said inter-connected pieces are connected by a dove-tail joint.

* * * * *

UNITED STATES PATENT AND TRADEMARK OFFICE
CERTIFICATE OF CORRECTION

PATENT NO. : 5,040,753
DATED : 8/20/91
INVENTOR(S) : STEVEN ROTH

It is certified that error appears in the above-identified patent and that said Letters Patent is hereby corrected as shown below:

Column 1, line 15, "upon" should be --open--.
Column 1, line 34, "b" should be --by--.
Column 1, line 41, "ar" should be --are--.
Column 1, line 45, "stripe" should be --strips--.
Column 1, line 48, "man" should be --many--.
Column 1, line 59, "ar" should be --are--.
Column 2, line 18, after "on" insert --a--.
Column 4, line 1, "space" should be --spaces--.
Column 4, line 59, "s" should be --so--.
Column 4, line 62, after "invention to" insert --a--.
Column 5, line 9, "aroun" should be --around--.
Column 5, line 16, "function" should be --functions--.
Column 6, line 19, "pip" should be --pipe--.

Signed and Sealed this

Third Day of November, 1992

*Attest:*

DOUGLAS B. COMER

*Attesting Officer*　　　*Acting Commissioner of Patents and Trademarks*